United States Patent [19]

Kehl

[11] 4,382,877

[45] May 10, 1983

[54] CATALYTIC SUPPORTS WITH CONTROLLED PORE PROPERTIES

[75] Inventor: William L. Kehl, Pittsburgh, Pa.

[73] Assignee: Gulf Research & Development Company, Pittsburgh, Pa.

[21] Appl. No.: 275,628

[22] Filed: Jun. 22, 1981

[51] Int. Cl.³ .............................................. B01J 27/14
[52] U.S. Cl. ................................... 252/437; 252/435; 208/216 PP; 208/217
[58] Field of Search ............................... 252/435, 437

[56] References Cited

U.S. PATENT DOCUMENTS

| | | | |
|---|---|---|---|
| 2,440,236 | 4/1948 | Stenton | 252/437 |
| 3,147,227 | 9/1964 | Hansford | 252/437 X |
| 3,211,801 | 10/1965 | Holm et al. | 252/437 |
| 3,502,595 | 3/1970 | Johnson | 252/437 |
| 3,537,816 | 11/1970 | Moscau | 423/328 X |
| 3,544,452 | 12/1970 | Joffe | 252/437 X |
| 3,660,274 | 5/1972 | Blozek et al. | 252/455 Z X |
| 3,697,550 | 10/1972 | Bayne et al. | 252/435 X |
| 4,066,572 | 1/1978 | Choca | 252/435 X |
| 4,158,621 | 6/1979 | Swift et al. | 252/437 X |
| 4,179,358 | 12/1979 | Swift et al. | 252/437 X |
| 4,228,036 | 10/1980 | Swift et al. | 252/437 |

FOREIGN PATENT DOCUMENTS 0917762  2/1963  United Kingdom ................ 252/437

Primary Examiner—Delbert E. Gantz
Assistant Examiner—William G. Wright
Attorney, Agent, or Firm—Deane E. Keith; Forrest D. Stine; Joseph J. Carducci

[57] ABSTRACT

A catalyst suitable for use in hydrotreating processes composed of a support containing (1) at least one Group IIA metal compound selected from the group consisting of magnesium, calcium, strontium and barium compounds, (2) alumina and (3) aluminum phosphate carrying a metal thereon.

32 Claims, No Drawings

CATALYTIC SUPPORTS WITH CONTROLLED PORE PROPERTIES

BACKGROUND OF THE INVENTION

1. Field of the Invention

The present invention relates to a catalyst suitable for use in hydrotreating processes composed of a support containing (1) at least one Group IIA metal compound selected from the group consisting of magnesium, calcium, strontium and barium compounds, (2) alumina and (3) aluminum phosphate carrying a metal thereon.

2. Description of the Prior Art

In my U.S. Pat. No. 4,210,560 I disclosed a support comprising magnesia, alumina and aluminum phosphate useful in combination with metals normally used in a hydrotreating process. In my U.S. patent application Ser. Nos. 275,652, 275,653 and 275,654, filed concurrently herewith, I have further disclosed supports containing Group IIA metal oxides, alumina and aluminum phosphate useful in combination with metals normally used in a hydrotreating process.

SUMMARY OF THE INVENTION

The invention defined and claimed herein is directed to a catalyst suitable for use in a hydrotreating process composed of a support containing (1) at least one Group IIA metal compound selected from the group consisting of magnesium, calcium, strontium and barium compounds, (2) alumina and (3) aluminum phosphate carrying a metal thereon. Among the Group IIA metal combinations that are preferred are those containing magnesium and calcium and strontium and barium.

The support can be prepared in any suitable manner, for example, as in my U.S. patent and U.S. patent applications defined hereinabove, whose disclosure is incorporated herein by reference. The support is amorphous and has an average pore radius of from about 10 Å to about 300 Å, preferably from about 75 Å to about 200 Å, a surface area ranging from about 100 m²/g to about 350 m²/g and a pore volume of from about 0.3 cc/g to about 1.5 cc/g, preferably from about 0.7 cc/g to about 1.2 cc/g. The Group IIA metal compound, which generally is present in its oxide form, will be present in the support in an amount ranging from about 0.5 to about 75 mole percent, preferably from about two to about 70 mole percent, alumina in an amount ranging from about two to about 90 mole percent, preferably from about eight to about 80 mole percent, and aluminum phosphate in an amount ranging from about three to about 95 mole percent, preferably from about five to about 80 mole percent. When more than one of said Group IIA metal compounds are present, they can be present in any and all proportions, since suitable supports can be prepared utilizing but one of any of the defined Group IIA metal compounds.

Among the metals, or combination of metals, that can be present on the surface of the defined support can be mentioned nickel, titanium, vanadium, copper, chromium, iron, cobalt, molybdenum and tungsten, generally in the form of their oxides. Among the metals that are preferred are nickel, tungsten, chromium, molybdenum and titanium. The total amount of said metal compound or compounds carried on the defined support, as elemental metal, will be in the range of about five to about 60 weight percent, but generally about eight to about 30 weight percent.

The catalyst can be prepared in any desired manner. For example, the defined support can be impregnated with an aqueous solution of a compound of one or combination of the above metals, preferably a salt thereof, such as the carbonate, nitrate, acetate, formate or the hydroxide metal salt thereof, dried at a temperature of about 120° to about 130° C. to drive off volatiles, such as water therefrom, and then calcined in air at a temperature of about 350° to about 700° C. for about six to about 12 hours. The resulting catalyst can then be crushed and sized, for example, to about five to about 50 mesh. It must be pointed out that in preparing the above catalyst, the Group IIA metal compound, the aluminum compound, phosphoric acid and the metal entity are used in molar amounts stoichiometrically corresponding to the amounts of Group IIA metal, aluminum, the catalytic metal and phosphate components present in the desired novel catalyst. It should be understood that in addition to the metals defined above, elements or compounds that are known to be useful for a definite purpose can also be added to the defined support. Thus, halogens, such as fluorine, to enhance the acidity of the catalyst, compounds of silica, such as silicic acid, for retardation of crystal growth, sulfates, such as ammonium sulfate, to enhance catalyst activity, can also be added to the catalyst. When these materials are added, they can be present in amounts up to about five weight percent.

The hydrotreating process in which the novel catalyst herein can be used to reduce the nitrogen and/or sulfur content thereof, for example, can be carried out over a wide range of conditions. Thus, a refinery feed, such as naphthas, lube oils, furnace oils, gas oils, residuals, can be passed over the novel catalyst herein at a liquid hourly space velocity (volume of liquid feed per volume of catalyst per hour, at ambient conditions of temperature and pressure) of about 0.25 to about 4.0, while maintaining in the reaction zone a temperature of about 300° to about 500° C., a total pressure of about 800 to about 4,000 pounds per square inch gauge (about 5.6 to about 28.0 MPa) and a hydrogen partial pressure of about 400 to about 4000 pounds per square inch gauge (about 2.9 to about 28.0 MPa).

DESCRIPTION OF PREFERRED EMBODIMENTS

A magnesia-alumina-aluminum phosphate support was prepared as follows. A first solution was prepared by dissolving 633 grams of aluminum nitrate in three liters of distilled water. A second solution was prepared by dissolving 48 grams of magnesium nitrate hexahydrate in 1.5 liters of distilled water. Next, the two solutions were combined and 13.5 grams of 85 percent aqueous phosphoric acid were added and the resulting mixture was agitated for about five minutes in a mixing vessel equipped with an electric stirrer. To a mixing container there was added two liters of distilled water. A stock solution of ammonium hydroxide was prepared by combining equal volume amounts of ammonium hydroxide and distilled water. The solutions were then added to the mixing container from two separate burets while maintaining a constant pH of 9.0. The resulting product was filtered, the filter cake was washed with 7.5 liters of distilled water, the washed filter cake was dried at 120° C. and a sample was then calcined in air at 500° C. for 10 hours. The pore properties of the calcined sample were measured following the procedure used in my U.S. Pat. No. 4,210,560. The pore data for the resulting support are set forth below in Table I.

TABLE I

| | |
|---|---|
| Median Pore Radius, Å | 60.0 |
| Pore Volume, cc/g | 0.58 |
| Average Pore Radius Å | 52.2 |
| Surface Area, m²/g | 223.8 |
| Pore Size Distribution | |
| 200–300 Å Radius | 10.0 |
| 100–200 Å Radius | 21.2 |
| 50–100 Å Radius | 30.1 |
| 40–50 Å Radius | 14.3 |
| 30–40 Å Radius | 11.9 |
| 20–30 Å Radius | 10.4 |
| <20 Å Radius | 2.0 |

The support was sized to 10 to 20 mesh and calcined in air at 538° C. for ten hours. A portion (50.58 grams) of the resulting support was impregnated with 81 cc. of an aqueous solution containing 22.83 grams of nickel nitrate hexahydrate, 19.69 grams of ammonium meta tungstate (analyzed to contain 92.5 weight percent WO₃) and 3.27 grams of 49 percent aqueous hydrofluoric acid and then dried in air at 120° C. for 24 hours and then calcined in air at 538° C. for ten hours. The resultant catalyst was composed of a support containing 18 mole percent magnesia, 71 mole percent alumina and 11 mole percent aluminum phosphate carrying nickel oxide (six weight percent as nickel), tungstic oxide (19 weight percent as tungsten) and two weight percent fluorine.

The above catalyst was evaluated in a microreactor test unit employing 30 cc of 10 to 20 mesh catalyst. Pretreatment involved sulfiding the catalyst by passing thereover three standard cubic feet per hour (0.085 m³/hour) of a gas containing eight volume percent H₂S and 92 volume percent hydrogen over a period of two hours while maintaining the temperature at 316° C. and atmospheric pressure. Thereafter a Kuwait heavy lube oil distillate was passed over the catalyst at a liquid hourly space velocity of 1.0 together with a hydrogen stream containing 15 volume percent of methane. The hydrogen stream was passed over the catalyst at the rate of 1120 liters of hydrogen per liter of liquid feed. Each catalyst was tested for a period of 24 hours at total pressures of 3000 pounds per square inch gauge (20.67 MPa) and 2500 pounds per square inch gauge (17.22 MPa) while maintaining the temperature at 382° C. The data are summarized below in Table II.

TABLE II

| | Run No. 1 | Run No. 2 |
|---|---|---|
| Total Pressure, PSIG (MPa) | 3000 (20.67) | 2500 (17.22) |
| Hydrogen Partial Pressure, PSIG, (MPa) | 2550 (20) | 2125 (15) |
| Nitrogen In Feed, PPM | 1300 | 1300 |
| Sulfur In Feed, Wt. % | 3.42 | 3.42 |
| Nitrogen In Treated Product, PPM | 90 | 130 |
| Sulfur In Treated Product, Wt. % | 0.21 | 0.12 |

The above clearly demonstrates that the novel catalyst herein can be used in hydrotreating a hydrocarbon feed stock to reduce the nitrogen and sulfur content thereof.

Obviously, many modifications and variations of the invention, as hereinabove set forth, can be made without departing from the spirit and scope thereof, and therefore only such limitations should be imposed as are indicated in the appended claims.

I claim:

1. A catalyst composed of a support containing (1) one or more of a Group IIA metal compound selected from the group consisting of magnesium, calcium, strontium and barium compounds, (2) alumina and (3) aluminum phosphate carrying at least one metal selected from the group consisting of nickel, titanium, vanadium, copper, chromium, iron, cobalt, molybdenum and tungsten thereon, said support having an average pore radius of from about 10 Å, to about 300 Å, a surface area ranging from about 100 m²/g to about 350 m²/g and a pore volume of from about 0.3 cc/g to about 1.5 cc/g, said Group IIA metal compound being present in an amount ranging from about 0.5 to about 75 mole percent, alumina in an amount ranging from about two to about 90 mole percent and aluminum phosphate in an amount ranging from about three to about 95 mole percent, said metal being present in the range of about five to about 60 weight percent.

2. The catalyst of claim 1 wherein said support has an average pore radius of about 75 Å to about 200 Å, a surface area of about 125 m²/g to about 250 m²/g and a pore volume of from about 0.7 cc/g to about 1.2 cc/g, said Group IIA metal compound being present in an amount ranging from about two to about 70 mole percent, alumina in an amount ranging from about eight to about 80 mole percent and aluminum phosphate in an amount ranging from five to about 80 mole percent, said metal being present in the range of about eight to about 30 weight percent.

3. The catalyst of claim 1 wherein said Group IIA metal compound is a Group IIA metal oxide.

4. The catalyst of claim 2 wherein said Group IIA metal compound is a Group IIA metal oxide.

5. The catalyst of claim 1 wherein said Group IIA metal compound is magnesia.

6. The catalyst of claim 2 wherein said Group IIA metal compound is magnesia.

7. The catalyst of claim 1 wherein said Group IIA metal compound is calcium oxide.

8. The catalyst of claim 2 wherein said Group IIA metal compound is calcium oxide.

9. The catalyst of claim 1 wherein said Group IIA metal compound is strontium oxide.

10. The catalyst of claim 2 wherein said Group IIA metal compound is at strontium oxide.

11. The catalyst of claim 1 wherein said Group IIA metal compound is barium oxide.

12. The catalyst of claim 2 wherein said Group IIA metal compound is barium oxide.

13. The catalyst of claim 1 wherein said Group IIA metal component includes magnesia and calcium oxide.

14. The catalyst of claim 2 wherein said Group IIA metal component includes magnesia and calcium oxide.

15. The catalyst of claim 1 wherein said Group IIA metal component includes strontium and barium oxides.

16. The catalyst of claim 2 wherein said Group IIA metal component includes strontium and barium oxides.

17. The catalyst of claim 1 wherein said metal is nickel.

18. The catalyst of claim 2 wherein said metal is nickel.

19. The catalyst of claim 1 wherein said metal is tungsten.

20. The catalyst of claim 2 wherein said metal is tungsten.

21. The catalyst of claim 1 wherein said metal component is chromium.

22. The catalyst of claim 2 wherein said metal component is chromium.

23. The catalyst of claim 1 wherein said metal component is molybdenum.

24. The catalyst of claim 2 wherein said metal component is molybdenum.

25. The catalyst of claim 1 wherein said metal component is titanium.

26. The catalyst of claim 2 wherein said metal component is titanium.

27. The catalyst of claim 1 wherein said metal component includes nickel and tungsten.

28. The catalyst of claim 2 wherein said metal component includes nickel and tungsten.

29. The catalyst of claim 1 wherein said catalyst additionally includes fluorine.

30. The catalyst of claim 2 wherein said catalyst additionally includes fluorine.

31. The catalyst of claim 27 wherein said catalyst additionally includes fluorine.

32. The catalyst of claim 28 wherein said catalyst additionally includes fluorine.

* * * * *